J. B. SMITH.
Device for Greasing Baking-Dishes.

No. 205,004. Patented June 18, 1878.

Witnesses=
Thos. H. Dodge
Edwin E. Moore

Inventor=
Jane B. Smith

UNITED STATES PATENT OFFICE.

JANE B. SMITH, OF WORCESTER, MASSACHUSETTS.

IMPROVEMENT IN DEVICES FOR GREASING BAKING-DISHES.

Specification forming part of Letters Patent No. 205,004, dated June 18, 1878; application filed June 3, 1878.

*To all whom it may concern:*

Be it known that I, JANE B. SMITH, of the city and county of Worcester, and Commonwealth of Massachusetts, have invented certain new and useful Improvements in Devices for Greasing Baking-Dishes, Plates, &c.; and I do hereby declare that the following is a full, clear, and exact description of the same, reference being had to the accompanying drawings, forming a part of this specification, and in which—

Figure 1:
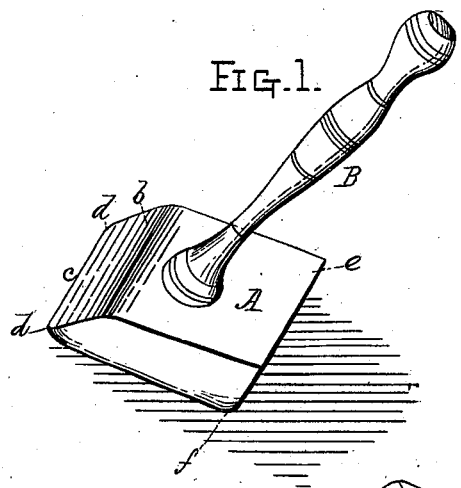
Figure 2:
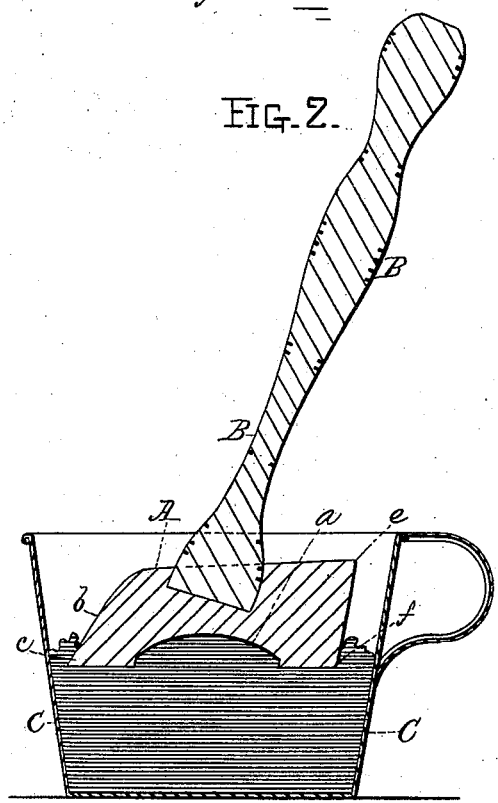

Figure 1 represents a perspective view of my improved device; and Fig. 2 represents, upon an enlarged scale, a vertical central section of the device as it appears when placed in a cup of lard, which latter is also shown in section.

To enable those skilled in the art to which my invention belongs to make and use the same, I will proceed to describe it more in detail.

In the drawings, the part marked A represents the base of the device, the lower surface of which is rectangular in shape, with a recess or chamber, $a$, in the center. (See Fig. 2.) B is the handle, which may be secured to the base A in any suitable manner. Handle B is set at an angle, as fully indicated in the drawings, whereby the device can be operated very conveniently, no matter what the shape of the baking-dish may be.

The front of the base A is rounded off and beveled back, as indicated at $b$ in the drawings, while the front lower edge $c$ is quite even, the corners $d\ d$ being slightly rounded off.

The rear upper edge $e$ extends slightly back over the lower rounded edge $f$.

I prefer to make the device of wood, since it can be made of such material very cheaply, and the base A being made of wood is not liable to scratch metallic baking pans and dishes.

The mode of operation is as follows: The operator takes hold of the handle B and presses the lower surface of the base A upon lard or other greasing substance, which may be contained in a cup, C, or other suitable receptacle, after which the device is removed and the lower surface of A applied to the warmed surface of the baking pan or dish, and as the grease is melted it can be quickly and conveniently rubbed over the entire surface of the baking dish or plate and into the corners by means of the peculiarly-constructed base A, the edge $c$, rounded corners $d\ d$, beveled surface $b$, projecting edge $e$, and rounded corner $f$, enabling the operator, while holding the device by handle B, to reach and grease the inner surfaces of the various kinds of baking dishes and plates.

When the base A is pressed upon the lard or grease, chamber $a$ is filled; consequently the device can be used for greasing a large number of baking dishes or plates with only a single application to the lard or grease.

Having described my improved device for greasing baking dishes and plates, what I claim therein as new and of my invention, and desire to secure by Letters Patent, as an improved article of manufacture, is—

A device for greasing baking dishes and plates, the several parts of which are constructed and arranged substantially as shown and described.

JANE B. SMITH.

Witnesses:
 THOS. H. DODGE,
 EDWIN E. MOORE.